United States Patent
Sandstrom et al.

(10) Patent No.: US 8,925,702 B2
(45) Date of Patent: Jan. 6, 2015

(54) PTM MULTIPLEX HYDRAULIC DIAGRAM WITH TWO POSITION SPOOL VALVE

(75) Inventors: Eric C. Sandstrom, Oxford, MI (US); Larry A. Pritchard, Macomb, MI (US); David Chen, Troy, MI (US)

(73) Assignee: BorgWarner Inc., Auburn Hills, MI (US)

( * ) Notice: Subject to any disclaimer, the term of this patent is extended or adjusted under 35 U.S.C. 154(b) by 1761 days.

(21) Appl. No.: 12/373,549

(22) PCT Filed: Jul. 18, 2007

(86) PCT No.: PCT/US2007/016275
§ 371 (c)(1), (2), (4) Date: Jan. 13, 2009

(87) PCT Pub. No.: WO2008/011060
PCT Pub. Date: Jan. 24, 2008

(65) Prior Publication Data
US 2009/0288929 A1 Nov. 26, 2009

Related U.S. Application Data

(60) Provisional application No. 60/831,533, filed on Jul. 18, 2006.

(51) Int. Cl.
| | |
|---|---|
| *F16D 21/02* | (2006.01) |
| *F16D 48/02* | (2006.01) |
| *B60W 10/119* | (2012.01) |
| *B60W 10/16* | (2012.01) |
| *B60W 30/182* | (2012.01) |

(52) U.S. Cl.
CPC ......... *F16D 48/0206* (2013.01); *B60W 10/119* (2013.01); *B60W 10/16* (2013.01); *B60W 30/182* (2013.01)

USPC .......................................... 192/48.601; 192/94

(58) Field of Classification Search
USPC ........... 192/48.601, 48.618, 85.59, 85.63, 94; 475/238, 239
See application file for complete search history.

(56) References Cited

U.S. PATENT DOCUMENTS

| | | | | |
|---|---|---|---|---|
| 5,934,432 | A  * | 8/1999 | Bates ......................... | 192/85.59 |
| 6,766,889 | B1 * | 7/2004 | Pennycuff ...................... | 192/35 |
| 6,810,983 | B2 * | 11/2004 | Matsuno ....................... | 180/249 |
| 6,883,657 | B2 * | 4/2005 | Bansbach et al. .......... | 192/85.24 |
| 7,757,831 | B2 * | 7/2010 | Stehr et al. ................. | 192/85.63 |

FOREIGN PATENT DOCUMENTS

| | | |
|---|---|---|
| DE | 103 44 972  A1 | 4/2005 |
| EP | 1 538 039  A | 6/2005 |

(Continued)

*Primary Examiner* — Troy Chambers
*Assistant Examiner* — Ryan Dodd
(74) *Attorney, Agent, or Firm* — Warn Partners, P.C.

(57) ABSTRACT

The present invention relates to a clutch actuation mechanism having a valve, a plurality of couplings in fluid communication with the valve, wherein one of the plurality of couplings is operable to distribute power between a primary set of wheels and a secondary set of wheels, and another of the plurality of couplings is operable to distribute power between each of the secondary set of wheels. The present invention also includes a drive shaft driven by a source of power, which is also connected to the secondary set of wheels, and a pressure supply device in fluid communication with the valve, wherein the valve directs fluid to the plurality of couplings, and when the valve directs fluid to the one of the plurality of couplings operable to distribute power between the primary set and secondary set of wheels, the drive shaft will transfer power to the secondary set of wheels.

2 Claims, 2 Drawing Sheets

(56) References Cited

FOREIGN PATENT DOCUMENTS

| | | | |
|---|---|---|---|
| EP | 1 561 628 A2 | 8/2005 | |
| JP | 61 149621 A | 7/1986 | |
| WO | WO 2006/068607 | * 6/2006 | ........... B60K 17/354 |
| WO | WO 2006/068607 A | 6/2006 | |

\* cited by examiner

PTM MULTIPLEX HYDRAULIC DIAGRAM WITH TWO POSITION SPOOL VALVE

CROSS-REFERENCE TO RELATED APPLICATIONS

This application claims the benefit of U.S. Provisional Application No. 60/831,533, filed Jul. 18, 2006.

FIELD OF THE INVENTION

The present invention relates to a multiplex hydraulic assembly used in a vehicle having all-wheel drive capability.

BACKGROUND OF THE INVENTION

All-wheel drive capability improves vehicle stability, control, as well as handling, especially when driving during conditions when the road is slippery, caused by rain or snow. All-wheel drive can also improve vehicle performance on non-paved surfaces as well, such as gravel or dirt.

Implementing all-wheel drive capability into a vehicle can be accomplished in several ways, one of which includes the use of a hydraulic coupling. The hydraulic coupling is essentially a clutch pack assembly actuated by hydraulic fluid, and allows power to be transferred to a secondary set of wheels as dictated by various driving conditions. For example, a vehicle which is primarily front-wheel drive may incorporate the use of a coupling to transfer some of the power from the engine to the rear wheels when needed. A hydraulic coupling can also be used to serve as a limited slip differential (LSD) for the front or rear wheels. For example, if the hydraulic coupling is being used as an LSD for the rear wheels, the coupling can balance the power delivered to the right rear wheel and left rear wheel. The coupling can also be fully engaged, making the right and left rear wheels rotate together, and behave as if the vehicle has a solid rear axle.

Incorporating the use of two hydraulic couplings can have an even greater effect on improving vehicle handling and stability. One coupling can be used to transfer power to a secondary set of wheels, and another coupling can be used to balance the power distribution between the right wheel and left wheel for that same set of wheels. Essentially, two hydraulic couplings can be used on one set of wheels. However, designs using multiple clutches encounter packaging problems. Clutches used in transmissions, transfer cases, differential assemblies, and the like, all occupy space within the vehicle, and the components used to actuate clutches used in various applications occupy space as well. Due to increasing standards for reductions in size and vehicle weight, there exists a need to reduce the number of components used to actuate clutch assemblies.

Therefore, it is desirable to develop a hydraulic assembly in which a single multi-position valve is used to control the hydraulic pressure transferred to the first and second clutch. Furthermore, it is desirable to develop a hydraulic assembly which uses minimal parts in order to control the amount of hydraulic pressure applied to the clutches.

SUMMARY OF THE INVENTION

The present invention relates to a clutch actuation mechanism having a valve, a plurality of couplings in fluid communication with the valve, wherein one of the plurality of couplings is operable to distribute power between a primary set of wheels and a secondary set of wheels, and another of the plurality of couplings is operable to distribute power between each of the secondary set of wheels.

The present invention also includes a drive shaft driven by a source of power, which is also connected to the secondary set of wheels, and a pressure supply device in fluid communication with the valve, wherein the valve directs fluid to the plurality of couplings, and when the valve directs fluid to the one of the plurality of couplings operable to distribute power between the primary set of wheels and the secondary set of wheels, the drive shaft will transfer power to the secondary set of wheels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
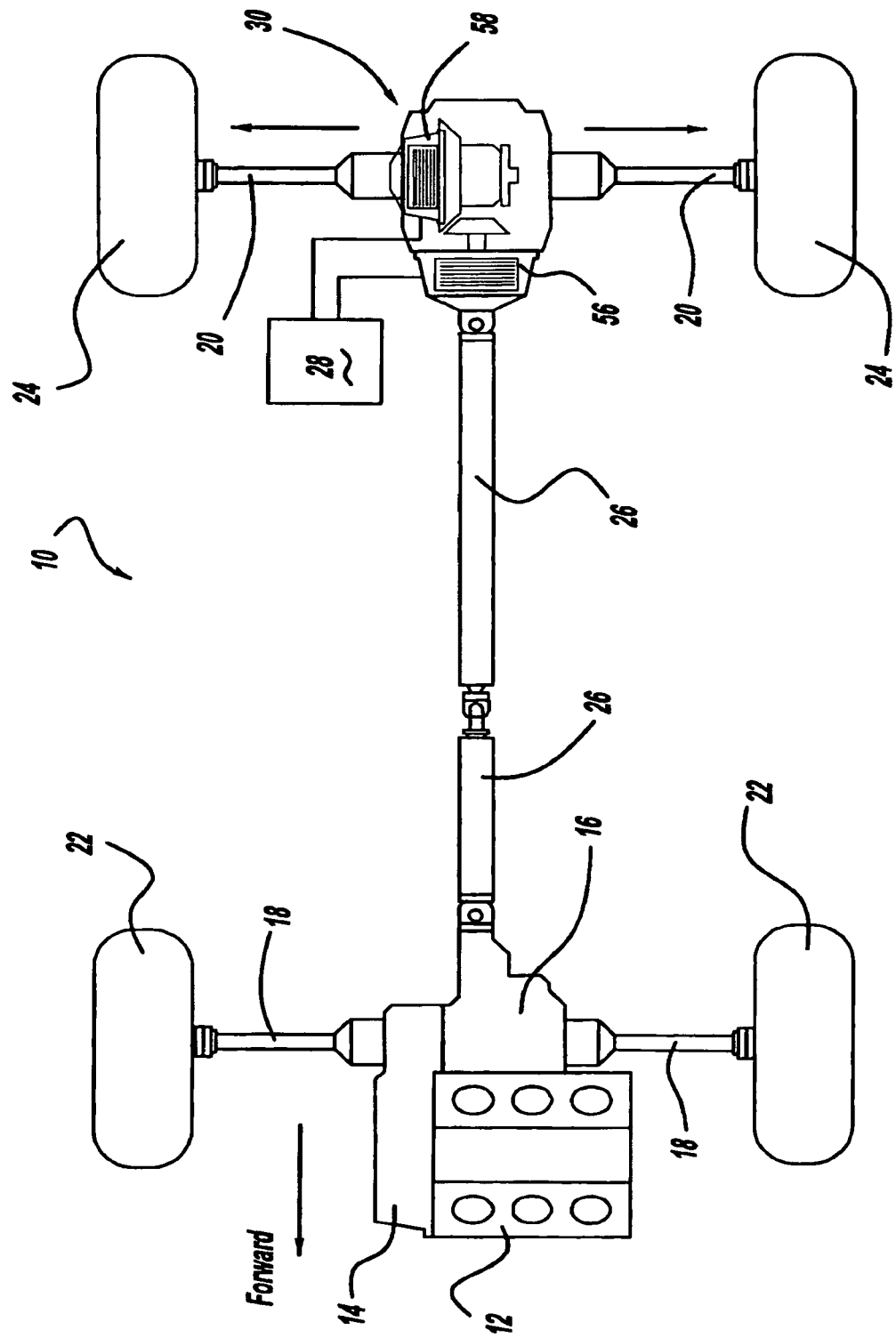
FIG. 1 is a diagram of a vehicle powertrain incorporating the present invention.

Referring to FIG. 1, a vehicle using a multiplexed hydraulic control is general shown at 10. The vehicle 10 has an engine 12, which is connection to a transmission 14. The transmission 14 is connected to a transfer case 16. The transfer case 16 is able to transfer power to a first or front axle 18 and a second or rear axle 20. The front axle 18 and rear axle 20 have wheels 22, 24, respectively, operably connected at the ends of the axles 18, 20. The engine 12 transfers torque to the wheels 22 through the transmission 14, the transfer case 16, and the front axle 18. The engine 12 also transfers torque to the rear axle 20 and wheels 24 through the transmission 14, transfer case 16, and a drive shaft 26 connected to the transfer case 16. The drive shaft 26 in this embodiment is a two-piece drive shaft 26, but it is within the scope of the invention that a single piece drive shaft could be used as well. Furthermore, a control unit, shown schematically at 28, is used to monitor the operating conditions of the vehicle 10. Typically, the control unit 28 is an engine control unit (ECU). However, it should be appreciated that the control unit 28 can be any separate control unit 28 connected to the ECU.

The drive shaft 26 is operably connected to a coupling device or a two-coupling all-wheel drive (AWD) device, shown generally at 30. The two-coupling AWD device 30 is connected to the rear axle 20 and drive shaft 26. By way of illustration but not limitation, the vehicle 10 is configured primarily as a front wheel drive vehicle having the ability to selectively transfer power to the rear wheels 24, with the front wheels 22 is generally referred to in the specification as the primary set of wheels 22, and the rear wheels 24 is referenced with respect to the secondary set of wheels 24. However, it should be appreciated that in the present invention this is interchangeable, where the vehicle 10 could be primarily a rear wheel drive vehicle having the ability to selectively transfer power to the front wheels 18, such that the rear wheels 24 can be the primary set of wheels and the front wheels 22 can be the second set of wheels.

Figure 2:
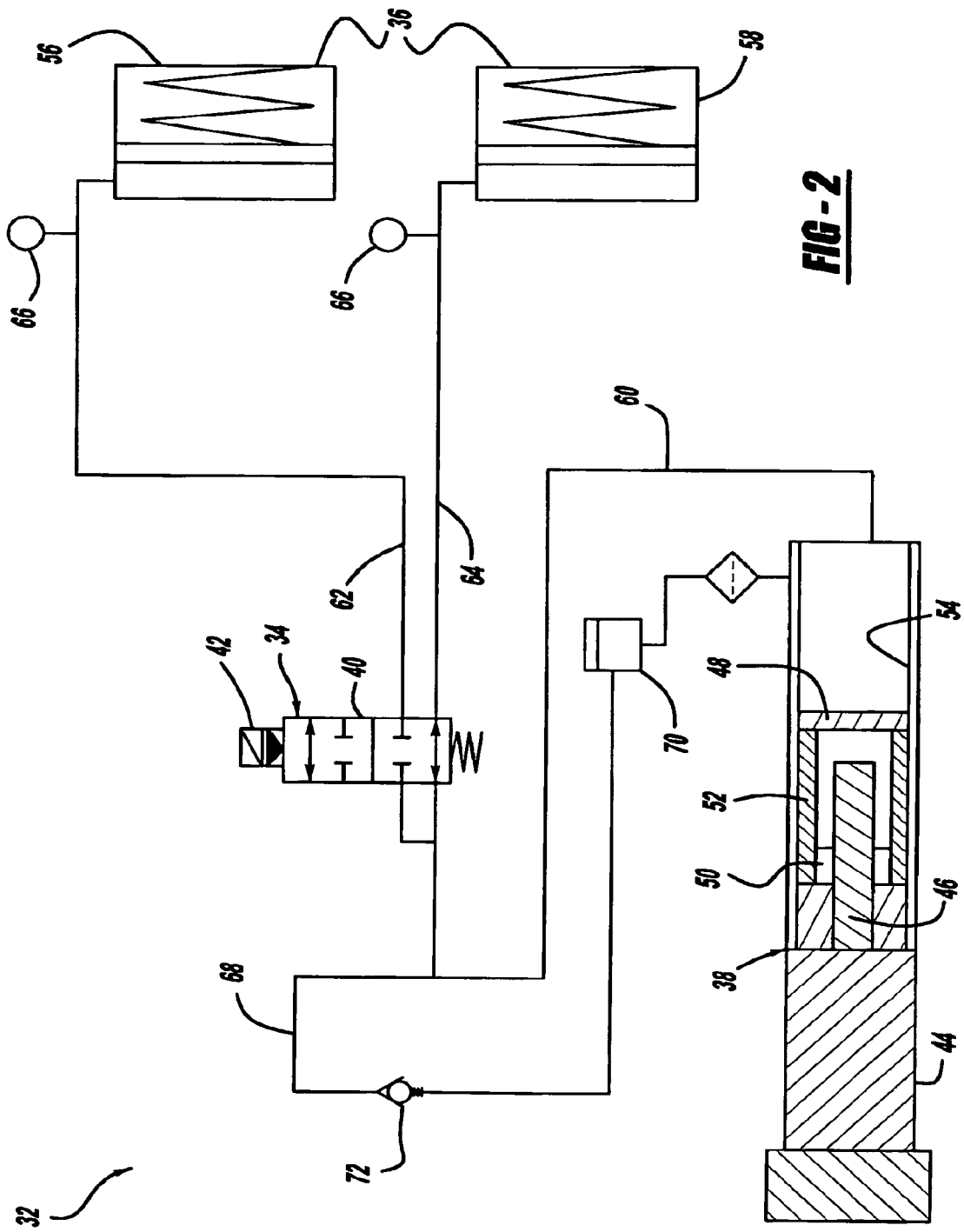
FIG. 2 is a schematic diagram of the hydraulic assembly in accordance with the present invention.

Referring to FIGS. 1 and 2, a multiplexed hydraulic control assembly is generally shown at 32. The multiplexed hydraulic control 32 provides a solenoid valve generally indicated at 34, a plurality of couplings or clutch packs 36, and a pressure supply device generally indicated at 38. Preferably, the solenoid valve 34 includes a two-position spool valve 40 operated by a solenoid 42. Thus, the solenoid valve 34, the couplings 36, and the pressure supply device 38 are in fluid communication, such that the spool valve 40 changes positions in order to direct the hydraulic pressure transferred from the pressure supply device 38 to the couplings 36.

In a preferred embodiment, the supply device 38 has a driving mechanism 44, a ball screw 46, and a displacement piston 48. Typically, the driving mechanism 44 is a bi-directional motor and gear reduction set which allows the driving mechanism 44 to rotate the ball screw 46. The ball screw 46 is operably connected to the piston 48 by the use of a ball nut 50, and sleeve 52, so that as the ball screw 46 rotates, the ball nut 50, sleeve 52, and piston 48 translate in a cylinder 54. As the motor 44 rotates, the ball screw 46 is actuated and moves the displacement piston 48. The piston 48 is slidably disposed in the cylinder 54. Thus, as the piston 48 slides in the cylinder 54, the pressure of the hydraulic fluid in the hydraulic control assembly 32 increases and decreases depending on the direction of movement of the piston 48.

Preferably, the couplings 36 are used to distribute the power from the engine 12 to the wheels 22, 24. A first coupling 56 is used to control power distribution from the engine 12 between the primary set of wheels 22 and the secondary set of wheels 24. A second coupling 58 is used to control power distribution between the secondary wheels 24. Thus, the second coupling 58 is preferably a limited slip differential (LSD) coupling, which controls speed differences between the wheels of the secondary set of wheels 24. The limited slip differential prevents an excessive speed difference from occurring between the secondary set of wheels 24 under certain operating conditions. For example, when the vehicle 10 is operating on a surface of unequal traction capacity, the couplings 36 are used to control excessive slip on the wheels 22, 24 with less traction. This results in an increase of torque transferred to the wheels 22, 24 with more traction; thus, improving the traction ability of the vehicle 10.

In operation, the control unit 28 commands the pressure supply device 38 to increase or decrease the hydraulic pressure transferred to the couplings 36. Thus, the driving mechanism 44 rotates the ball screw 46 which slides the piston 48 in the cylinder 54. Depending on the direction of movement of the piston 48, the hydraulic pressure increases or decreases in a first fluid passage 60, which fluidly connects the pressure supply device 38 to the solenoid valve 34. The control unit 28 also transfers an electrical current to the solenoid 42 in order to alter the position of the spool valve 40 in order to control the flow of hydraulic fluid to the couplings 36. Thus, as an electrical current is transferred to the solenoid valve 34, a magnetic flux is created by a coil of the solenoid 42 which causes the spool valve 40 to move and open either a second fluid passage 62, a third fluid passage 64, or any combination thereof. Depending on the position of the spool valve 40, the hydraulic pressure from the pressure supply device 38 is transferred to either the first coupling 56, the second coupling 58, or any combination thereof.

Typically, pressure sensors 66 are located on the second fluid passage 62 and third fluid passage 64 in order to determine the hydraulic pressure and transfer the data to the control unit 28. Further, a fourth hydraulic passage 68 connects an input of the solenoid valve 34, the first hydraulic passage 60, and a reservoir 70. The fourth hydraulic passage 68 has a check valve 72 which is used to bleed the air that is in the hydraulic fluid. The check valve 72 can be any suitable check valve, such as but not limited to, a bias spring ball, in which a force is applied to the ball against the spring in order to create an opening in which the air is released from the fourth fluid passage 68. Thus, the check valve 72 is only capable of allowing air flow in one direction in order to prevent air from entering the multiplexed hydraulic control assembly 32.

Preferably, the first coupling 56 is used to balance the amount of power delivered between the primary set of wheels 22 and the secondary set of wheels 24 in the vehicle 10. When the first coupling 56 is in a fully engaged position, an equal amount of power is transferred to both the primary set of wheels 22 and the secondary set of wheels 24. When the first coupling 56 is in a fully disengaged position, power from the engine 12 is transferred to the primary set of wheels 22 only. The first coupling 56 is also operated to balance and distribute power from the engine 12 to the secondary set of wheels 24 in any amount between the fully engaged and fully disengaged positions.

The second coupling 58 is used to control the power distribution between the secondary set of wheels 24, essentially acting as a controlled limited slip differential. The range of operation of the second coupling 58 is from a fully engaged position to a fully disengaged position. When the second coupling 58 is in the fully engaged position, the secondary set of wheels 24 rotate at the same speed, receive equal amounts of power from the engine 12, and behave in a similar fashion as to wheels having a solid axle. When the second coupling 58 is in the fully disengaged position, the secondary set of wheels 24 are free to rotate at different speeds, and behave in a similar manner to a set of wheels having an open differential. The second coupling 58 is also used to balance the amount of power split between the secondary set of wheels 24 to any range between the fully engaged position and fully disengaged position.

It should be appreciated that the multiplexed hydraulic control 32 can be incorporated into a transmission, transfer case, or other device where control over two clutch assemblies by use of one actuator is necessary.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An arrangement of a vehicle with all-wheel drive capability with primary front-wheel drive and having a limited slip differential for the rear wheels, said arrangement including a clutch actuation mechanism, said arrangement comprising:
   a transmission;
   a primary set of front wheels operably connected to said transmission, wherein torque is transferred from said transmission to said primary set of wheels;
   a drive shaft operably connected to said transmission;
   a first clutch pack and a second clutch pack operably connected to said drive shaft, and wherein said first clutch pack controls a torque distribution between said primary set of wheels and said secondary set of wheels;
   a secondary set of rear wheels operably connected to said first clutch pack and said second clutch pack such that torque is transferred from said transmission, through said drive shaft and said first clutch pack and said second clutch pack to said secondary set of wheels said second clutch pack controls a torque distribution between a first and second wheel of said secondary set of rear wheels;

a single solenoid valve operably associated with said first clutch pack via a second fluid passage and said second clutch pack via a third fluid passage, wherein said solenoid valve selectively provides actuation of said first clutch pack and said second clutch pack to transfer torque to at least one of said primary set of wheels and said secondary set of wheels, and wherein hydraulic pressure is transferred to said first or said second clutch pack or a combination thereof;

said first clutch pack and said second clutch pack in fluid communication with said solenoid valve via a first fluid passage;

a cylinder in fluid communication with said solenoid valve;

a ball-screw mechanism operably connected to a motor; and a piston operably connected to said ball-screw, said piston being slidably disposed in said cylinder to direct fluid to said first clutch pack and said second clutch pack when said motor rotates said ball screw.

2. The arrangement of claim 1, further comprising a fourth hydraulic passage having a check valve and a sump, said fourth hydraulic passage fluidly connecting said solenoid valve and said cylinder, said check valve is disposed in said fourth hydraulic passage so as to purge air from said first, second and third hydraulic passages.

\* \* \* \* \*